United States Patent [19]

Viola et al.

[11] Patent Number: 4,506,418
[45] Date of Patent: Mar. 26, 1985

[54] MUFFLER CLAMP

[75] Inventors: Frank J. Viola, Uniondale; Anthony Scaduto, Brooklyn, both of N.Y.

[73] Assignee: Parker-Hannifin Corporation, Cleveland, Ohio

[21] Appl. No.: 450,873

[22] Filed: Dec. 20, 1982

[51] Int. Cl.³ .................. B65D 63/00; F16L 33/10
[52] U.S. Cl. .................. 24/277; 24/20 CW; 24/278; 24/284; 285/420
[58] Field of Search .............. 24/277, 276, 278, 283, 24/284, 285, 286, 20 R, 20 CW, 20 S, 21, 28; 285/199, 420, 382.2, 424; 228/142

[56] References Cited

U.S. PATENT DOCUMENTS

| 684,084 | 10/1901 | Mueller | 285/199 |
| 1,459,030 | 6/1923 | Mueller | 285/199 |
| 1,497,549 | 6/1924 | Conradi | 285/420 |
| 1,700,451 | 1/1929 | Ronci | 24/20 CW |
| 3,132,402 | 5/1964 | Joseph | 24/284 |
| 3,213,499 | 10/1965 | Zylstra | 24/20 R |
| 3,350,998 | 2/1967 | Deisenroth | 228/142 |
| 3,409,259 | 11/1968 | Cross | 24/277 |
| 3,919,747 | 11/1975 | Offterdinger | 24/277 |
| 3,984,134 | 10/1976 | Engman et al. . | |
| 4,040,152 | 8/1977 | Gilgallon . | |
| 4,056,869 | 11/1977 | Elsma, Jr. . | |
| 4,063,336 | 12/1977 | Jones et al. . | |
| 4,079,481 | 3/1978 | Cacicedo . | |
| 4,079,487 | 3/1978 | Coop, Sr. . | |
| 4,122,586 | 10/1978 | Nothdurft . | |
| 4,141,577 | 2/1979 | Beebe . | |
| 4,147,384 | 4/1979 | Heckethorn . | |
| 4,403,378 | 9/1983 | Engman | 24/277 |
| 4,415,188 | 11/1983 | Ginter, Jr. | 24/277 |

FOREIGN PATENT DOCUMENTS 1948881  4/1971  Fed. Rep. of Germany .......... 24/20

Primary Examiner—Victor N. Sakran
Attorney, Agent, or Firm—Frederick L. Tolhurst

[57] ABSTRACT

A muffler clamp wherein a retainer (22) is secured to a bracket (20) by nuts (24 and 26). The bracket (22) is provided with sections (38) and the retainer (22) has a flexible central region (40) such that the clamp can be tightly constricted about and secure exhaust system components in a range of sizes.

14 Claims, 12 Drawing Figures

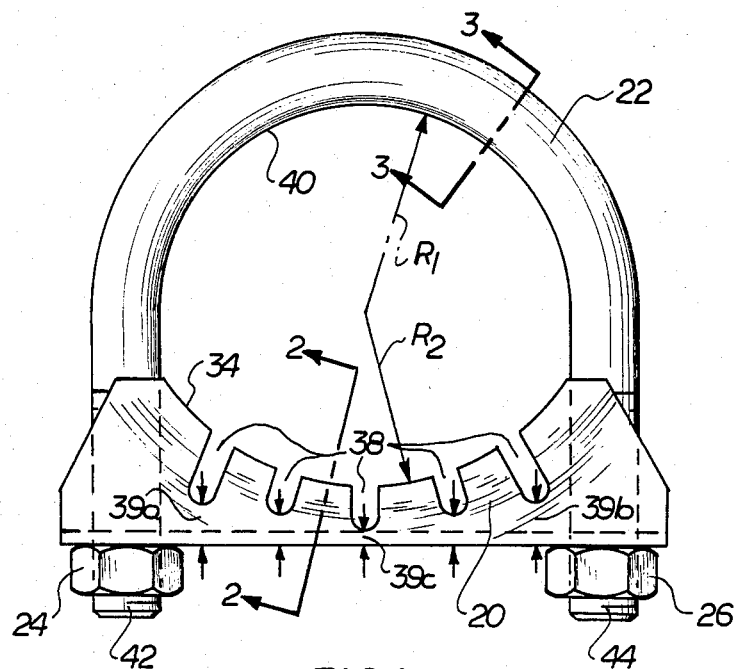
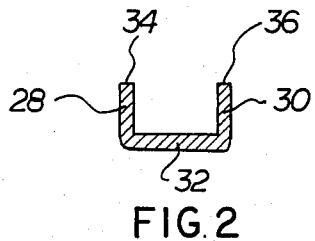
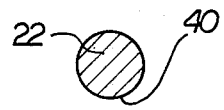
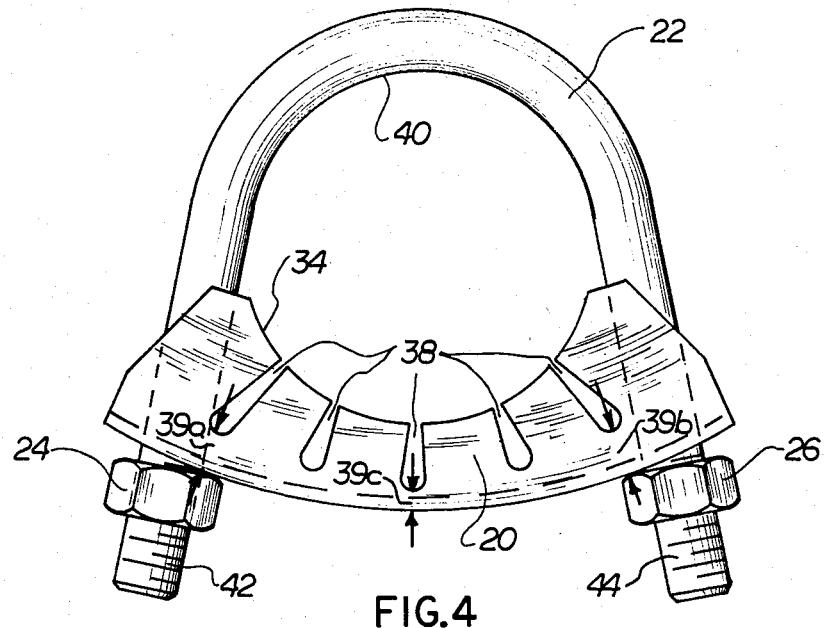

MUFFLER CLAMP

BACKGROUND OF THE INVENTION

1. Field of the Invention

The subject invention relates to clamps and, more particularly, to muffler clamps for securing the components of vehicular exhaust systems.

2. Description of the Prior Art

Vehicular exhaust systems include muffler, tail pipe, exhaust pipe and catalytic converter components that are joined together at concentrically fitting ends. For many years, these concentrically fitting ends have been secured by clamps that are fastened around the outwardly exposed surface. Typically, such clamps have included a u-shaped retainer that is secured to a saddle member by nuts or other fasteners such that the retainer and saddle tightly constrict about the concentric ends. Examples are shown in U.S. Pat. Nos. 3,984,134; 4,040,152; 4,141,577; 4,056,869; 4,063,336; 4,147,384; 4,079,487; and 4,122,586.

The nominal diameter of the exhaust system components is dependent on the operating parameters of the internal combustion engine that powers the vehicle. Thus, to accommodate the various engine sizes and types, exhaust systems are commercially available in a broad range of standard diameter sizes.

In the prior art, each muffler clamp has been designed and manufactured for a particular size of exhaust system. Thus, manufacturers, wholesalers, retailers and repair shops have been required to stock a large inventory of muffler clamps to enable them to service the full range of exhaust systems. For example, six sizes of clamps ranging in diameter from $1\frac{3}{4}$ inch to $2\frac{1}{2}$ inch are required to service most domestically manufactured automobiles.

It was recognized that a muffler clamp that could service several different sizes of exhaust systems would limit the inventory quantities required for manufacturers, distributors, and retailers thus resulting in substantial cost savings. Adjustable clamps that will accommodate a number of pipe sizes such as shown in U.S. Pat. No. 4,079,481 are known in the prior art. However, such prior clamps have been unsuitable for use on exhaust systems for various reasons. Accordingly, there was a need in the prior art for an adjustable clamp that would be suitable for use on vehicular exhaust systems.

SUMMARY OF THE INVENTION

In accordance with the subject invention, a clamp includes a bracket that has first and second walls that are spaced apart by a base. The edge of the first and second walls that is remote from the base has a concave contour and a plurality of sections are provided in the walls such that the base and side walls can be constricted from a maximum radius of curvature to a minimum radius of curvature. The clamp further includes a retainer having a curved central region wherein the radius of curvature is substantially the same as the radius of curvature of the concave edge of the bracket. Fasteners are also provided for securing the retainer to the bracket and constricting the bracket and retainer about a junction of the exhaust system.

Preferably, the central region of the retainer is annealed, notched or of a smaller radial dimension in comparison to the ends of the retainer such that the retainer is more flexible in the central region than adjacent the end portions.

Other details, objects and advantages of the invention will become apparent as the following description of certain presently preferred embodiments proceeds.

BRIEF DESCRIPTION OF THE DRAWINGS

The accompanying drawings show certain presently preferred embodiments of the subject invention in which:

FIG. 1 is a perspective view of one embodiment of the subject invention with the concave edge of the bracket and the curved central region of the retainer at a maximum radius of curvature;

FIGS. 2 and 3 are cross-sections of FIG. 1 taken along the line II—II and III—III respectively;

FIG. 4 is a perspective of the clamp shown in FIG. 1 with the concave edge of the bracket and the curved central region of the retainer constricted to a minimum radius of curvature;

DESCRIPTION OF THE PREFERRED EMBODIMENT

Figure 5:
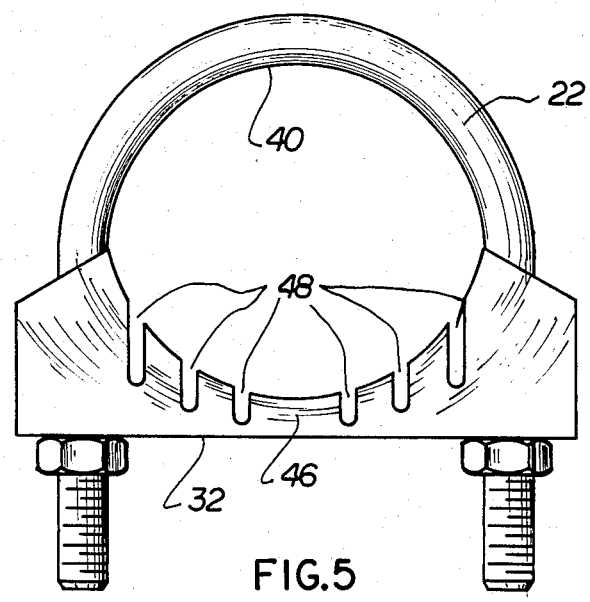
FIG. 5 is an elevation view of an alternative embodiment of the clamp of the subject invention with the concave edge of the bracket and curved central region of the retainer at a maximum radius of curvature wherein the sections of the bracket are generally aligned in a direction perpendicular to the base.

FIGS. 1–4 show a presently preferred embodiment of the clamp of the subject invention including a bracket 20, a retainer 22 which is in the form of a u-shaped bolt, and fastening means such as nuts 24 and 26.

As shown particularly in FIGS. 1 and 2, bracket 20 includes walls 28 and 30 which are joined to a base member 32 on opposite sides thereof to maintain walls 28 and 30 in parallel, spaced relationship with respect to each other. Base 32 is provided with holes in the opposite ends thereof and, preferably, the major plane of base 32 is arranged perpendicular to the major plane of walls 28 and 30.

Walls 28 and 30 are provided with edges 34 and 36 respectively. Edges 34 and 36 are located remote from the junction of the walls with the base 32 and have a generally concave contour with radius of curvature $R_2$. Walls 28 and 30 are provided with a plurality of sectioned areas 38 where the material of bracket 20 has been removed. In the embodiment of FIGS. 1–4, sectioned areas 38 are aligned in a generally radial direction with respect to the curvature of concave edges 34 and 36. Preferably, the height of walls 28 and 30 adjacent the closed end of sectioned areas 38 ranges between a maximum adjacent the ends of bracket 20 and a minimum adjacent the central region of the bracket. Measured orthogonally from base 32 to the closed end of sectioned area 38, the height of walls 28 and 30 is largest at 39a and 39b adjacent the ends of bracket 20 and is smallest at 39c adjacent the central area of bracket 20.

Retainer 22 is a u-shaped bolt having a curved central region 40 located between distal ends 42 and 44. Distal ends 42 and 44 are provided with machine threads and are spacially arranged to coincide with holes in base 32. As shown in FIG. 1, the radius of curvature $R_1$ of central region 40 is substantially the same as the radius of curvature $R_2$ of concave edges 34 and 36. In the preferred embodiment of FIGS. 1–4, retainer 22 is made of ferrous metal and is substantially circular in cross-section with central region 40 being annealed so that the flexibility of retainer 22 is greater in central region 40 than adjacent distal ends 42 and 44. Thus, retainer 22 will more readily constrict and conform to the surface of the exhaust system junction.

The clamp shown in FIGS. 1–4 can be applied to the concentric junction of exhaust system components of any standard diameter between and including maximum and minimum radii of curvature. For components of the diameter corresponding to the maximum radius of curvature, bracket 20 is placed against the outside surface of the component and retainer 22 is placed on the opposite side so that distal ends 42 and 44 project through the holes of base 32. Nuts 24 and 26 are then turned on the threads of distal ends 42 and 44 until the retainer and bracket constrict about the surface of the joint and secure the concentrically arranged components.

When the exhaust system diameter is smaller than the maximum radius of curvature, the same clamp is used to secure the components. As particularly shown in FIG. 4, nuts 24 and 26 are merely turned further down on the threads of distal ends 42 and 44. As bracket 20 and retainer 22 engage the surface of the smaller diameter component, the central region 40 of retainer 22 flexes to conform to the contour of the component surface. Similarly, sections 38 located in walls 28 and 30 of bracket 20 provide for lateral flexure of walls 28 and 30 and bending of base 32 such that concave edges 34 and 36 are flexed from a maximum radius of curvature toward a minimum radius of curvature.

The height of walls adjacent sectional areas 38 provides for lateral flexure of walls 28 and 30 first in central region of bracket 20 and then, as nuts 24 and 26 are turned further on ends 42 and 44, for lateral flexure adjacent the ends of bracket 20. Since walls 28 and 30 are lowest at 39c and become progressively higher toward 39a and 39b, bracket 20 first begins to constrict in the central area 39c and then, as more force is applied by nuts 24 and 26, lateral flexure of walls 28 and 30 progressively occurs in the intermediate and end portions of bracket 20. Thus, a continuous clamping force is applied to the exhaust system junction with no pockets or bulges in the sealing pressure applied by bracket 20.

The minimum radius of curvature for the clamp is determined by a number of variables including the material composition of bracket 20 and retainer 22 and the width of sections 38. For example, by appropriate selection of materials and dimensions, the clamp of FIGS. 1–4 can be designed to flex from a maximum curvature having a 1¼ inch radius to a minimum curvature having a 1-1/16 inch radius.

Figure 6:
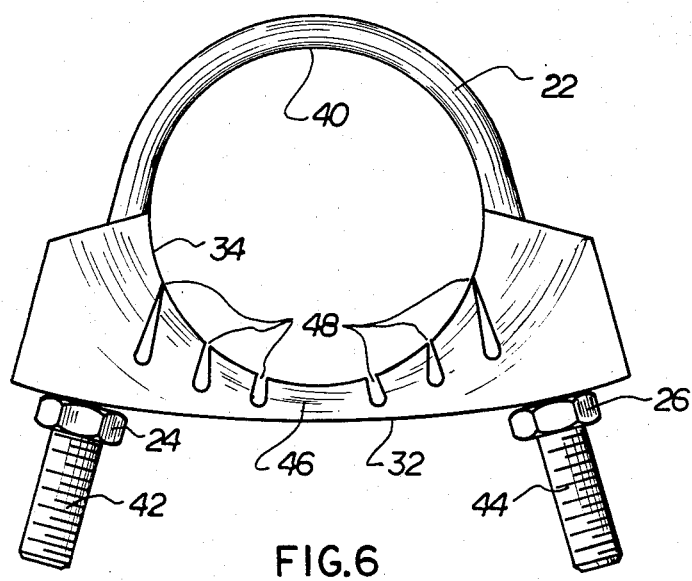
FIG. 6 is an elevation view of the clamp shown in FIG. 5 except that the concave edge of the bracket and curved central region of the retainer are at a minimum radius of curvature.

FIGS. 5 and 6 show an alternative embodiment of the subject invention that is similar to the clamp of FIGS. 1–4 except that the clamp of FIGS. 5 and 6 is provided with a modified bracket 46. Bracket 46 includes sections 48 arranged such that they are generally aligned in a direction perpendicular to base 32.

Figure 11:
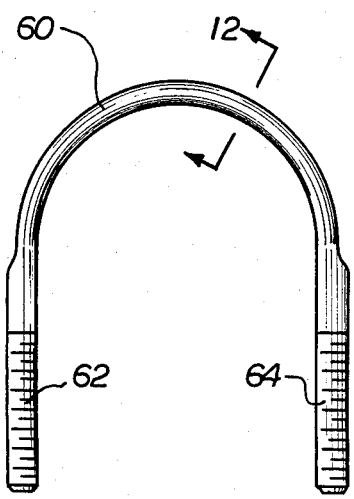
FIGS. 11 and 12 show yet another alternative embodiment of a retainer in accordance with the subject invention wherein the cross-sectional dimension of the central region of the retainer is smaller in the radial direction.
Figure 10:
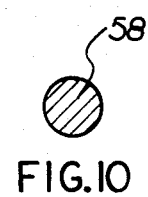
FIGS. 9 and 10 show another alternative embodiment of a retainer in accordance with the subject invention wherein the radial dimension of the retainer in the central region is smaller than the radial dimension adjacent the end portions.
Figure 12:
Figure 7:
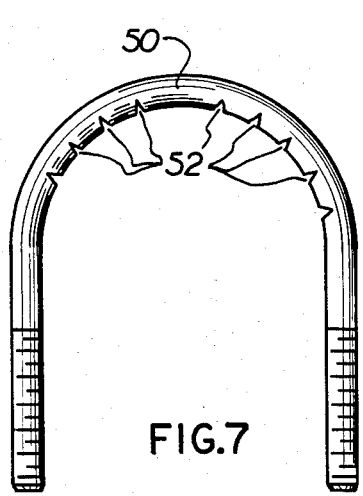
FIG. 7 shows an alternative embodiment of a retainer in accordance with the subject invention having internal notches in the central region.
Figure 8:
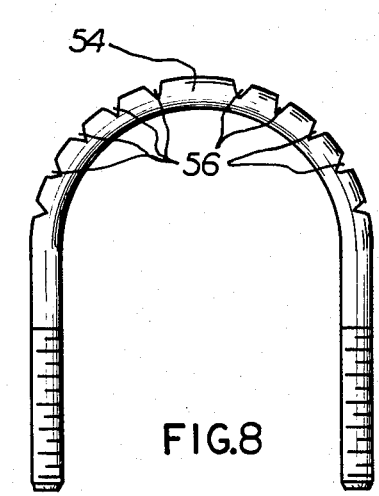
FIG. 8 shows a second alternative embodiment of a retainer in accordance with the subject invention wherein the notches are located on the external side of the retainer.
Figure 9:
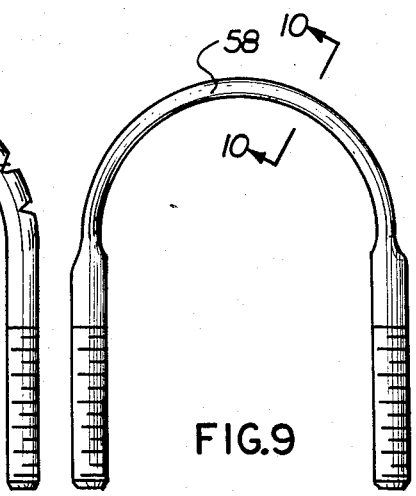

FIGS. 7–10 show alternative embodiments of retainer 22 which can be used with bracket 20 of FIGS. 1–4 or bracket 46 of FIGS. 5 and 6. In FIG. 7, a retainer 50 is provided with a plurality of notches 52 in the inner curvature of the central region. Notches 52 are aligned in a generally radial direction with respect to the curvature of the u-shaped bolt and provide retainer 50 with increased flexibility in the central region so that, as the clamp is tightened, retainer 50 more readily and completely conforms to the outer surface of the muffler system junction. Alternatively, FIG. 8 shows a retainer 54 having a plurality of notches 56 located along the exterior curvature of its central region. FIGS. 9 and 10 show another alternative embodiment for retainer 22 wherein a retainer 58 is of generally circular cross-section throughout the central region, but the diameter of retainer 58 in the central region is substantially smaller than the diameter adjacent the threaded end portions. FIGS. 11 and 12 show another embodiment of retainer 22 wherein a retainer 60 is non-circular cross-section throughout the central region with the cross-sectional dimension in the radial direction being smaller than the diameter of the adjacent distal ends 62 and 64.

While certain presently preferred embodiments of the subject invention are shown and described herein, the invention is not limited thereto but can be otherwise variously embodied within the scope of the following claims.

I claim:
1. A clamp comprising:
   a bracket having first and second walls that are maintained in spaced-apart relation by a base member and that have a central region located between opposite ends, said first and second walls each having a planar surface and an edge that is remote from said base member and that has a generally concave contour, said first and second walls each further having a plurality of sections in the planar surface thereof, said sections extending inwardly from the concave edge toward said base member with the portions of said first and second walls between said base member and the closed end of said sections being lowest in the central region of said walls and highest adjacent the ends of said walls, such that the plurality of sections are closed together as the base member is flexed inwardly;
   a retainer having a curved central region located between two distal ends, said central region having a radius of curvature substantially equal to the radius of curvature of the concave edge of said bracket; and
   fastening means for securing said retainer to said bracket adjacent the distal ends.

2. The clamp of claim 1 wherein the height of the walls of said bracket between said base member and the closed end of respective ones of said sections is progressively higher in the direction from the central region of said bracket toward the ends of said bracket.

3. The clamp of claim 1 or 2 wherein said retainer comprises a u-shaped bolt with an annealed central region such that the central region of said u-shaped bolt is more flexible than the distal end portions.

4. The clamp of claim 1 or 2 wherein said retainer comprises a u-shaped bolt wherein the flexibility of said bolt in the central region is greater than the flexibility of said bolt adjacent said distal end portions.

5. The clamp of claim 3 wherein said u-shaped bolt includes notches that are aligned in a generally radial direction with respect to the curvature of said u-shaped bolt.

6. The clamp of claims 1 or 2 wherein said retainer comprises a u-shaped bolt in which the radial dimension of said bolt in the central region is smaller than the radial dimension of said bolt adjacent the distal ends such that the central region is more flexible in the radial direction than the end portions.

7. The clamp of claim 1 or 6 wherein the sections of said bracket are aligned in a generally radial direction with respect to the concave edge of said first and second walls.

8. The clamp of claim 1 or 6 wherein the sections of said bracket are generally aligned in a direction perpendicular to said base member.

9. A muffler clamp comprising:
- a channel bracket having first and second walls that are fastened to opposite edges of a base plate that has openings at opposite ends thereof, said first and second walls having concave edges oppositely disposed from the edge fastened to the base plate with the edges having a concavity formed at a maximum radius of curvature, said first and second walls also having a plurality of sections located adjacent said concave edges and extending toward said base plate such that said base plate and side walls can be flexed toward a minimum radius of curvature along said concave edge;
- a u-shaped bolt having threaded end portions located at the distal ends thereof and having a central region located therebetween, said threaded ends being spacially arranged to project through the openings in the base plate; and
- fasteners for securing the threaded ends of said u-shaped bolt on the opposite side of the base plate from the first and second walls.

10. The clamp of claim 9 wherein the height of the walls of said bracket measured orthogonally from said base plate to the closed end of sections ranges from a maximum adjacent the ends of said bracket to a minimum adjacent the central region of said bracket.

11. The muffler clamp of claim 9 or 10 wherein said sections are generally aligned normal to said back plate.

12. The muffler clamp of claim 9 or 10 wherein said sections are generally aligned with the maximum radius of curvature of said concave edge.

13. The muffler clamp of claim 9 or 10 wherein the central region of said u-shaped bolt is annealed.

14. The muffler clamp of claim 9 or 10 wherein the radial dimension of said u-shaped clamp is smaller in the central region than adjacent the distal ends.

* * * * *